United States Patent [19]
Keen

[11] Patent Number: 5,241,375
[45] Date of Patent: Aug. 31, 1993

[54] CHROMINANCE NOISE REDUCTION APPARATUS EMPLOYING TWO-DIMENSIONAL RECURSIVE FILTERING OF MULTIPLEXED BASEBAND COLOR DIFFERENCE COMPONENTS

[75] Inventor: Ronald T. Keen, Indianapolis, Ind.

[73] Assignee: Thomson Consumer Electronics, Inc., Indianapolis, Ind.

[21] Appl. No.: 721,762

[22] Filed: Jun. 26, 1991

[51] Int. Cl.⁵ .............................. H04N 9/64
[52] U.S. Cl. ........................... 358/36; 358/40
[58] Field of Search ............ 358/36, 40, 31, 167

[56] References Cited

U.S. PATENT DOCUMENTS

| | | | |
|---|---|---|---|
| 4,030,121 | 6/1977 | Faroudja | 358/37 |
| 4,246,610 | 1/1981 | Takahashi | 358/167 |
| 4,558,353 | 12/1985 | Hirota | 358/36 |
| 4,670,775 | 6/1987 | Faroudja et al. | 358/36 |
| 4,888,642 | 12/1989 | Kato | 358/36 |
| 4,928,165 | 5/1990 | Kisou | 358/36 |

FOREIGN PATENT DOCUMENTS

| | | |
|---|---|---|
| 2523392 | 3/1982 | France . |
| 2648660 | 1/1990 | France . |
| 61212981 | 9/1990 | Japan . |
| 2-265391 | 10/1990 | Japan . |

Primary Examiner—Alvin E. Oberley
Assistant Examiner—Minsun Oh
Attorney, Agent, or Firm—Joseph S. Tripoli; Peter M. Emanuel; Richard G. Coalter

[57] ABSTRACT

Baseband chrominace components are time division multiplexed and subjected to vertical and horizontal recursive filtering thereby providing color component noise reduction in which vertical streaking characteristic of the vertical recursive filtering is effectively visually cancelled by horizontal streaking characteristic of the horizontal recursive filter thereby providing the benefits of (1) noise reduced baseband chrominance components (2) with minimal visual artifacts, (3) without requiring duplication of filtering elements whereby (4) reliability is increased and with a minimimum of filtering elements and (5) costs are proportionately reducted.

3 Claims, 2 Drawing Sheets 5,241,375

CHROMINANCE NOISE REDUCTION APPARATUS EMPLOYING TWO-DIMENSIONAL RECURSIVE FILTERING OF MULTIPLEXED BASEBAND COLOR DIFFERENCE COMPONENTS

FIELD OF THE INVENTION

This invention relates to television systems and particularly to apparatus for reducing noise in chrominance signal components of displayed color television images.

BACKGROUND OF THE INVENTION

Chrominance signal noise reduction systems may be categorized as belonging to one of two types, namely, those that operate on a quadrature amplitude modulated chrominance signal subcarrier directly and those that operate on demodulated color difference signals.

An example of noise reduction by processing modulated chrominance signal is described by Hirota in U.S. Pat. No. 4,558,353 entitled CIRCUIT FOR REDUCING NOISE IN A CARRIER CHROMINANCE SIGNAL which issued Dec. 10, 1985. The Hirota system includes circuitry for detecting noise in a narrow band region of a chrominance signal carrier wave and for subtracting the narrow band noise from the full bandwidth chrominance signal to provide a noise reduced chrominance signal carrier wave. It is stated that the noise component can be effectively eliminated especially when there is no change or only a small change in color, that is, when side band components of the carrier chrominance signal are small.

Another example of a chrominance noise reduction system which operates on the modulated chrominance signal carrier wave is described by Takahashi in U.S. Pat. No. 4,246,610 entitled NOISE REDUCTION SYSTEM FOR COLOR TELEVISION SIGNAL In this system frame recursive filtering is applied to a composite video signal to provide noise reduction in the temporal dimension (i.e., from frame to frame). To accommodate the presence of the color subcarrier in the composite signal being filtered, the system includes a chrominance signal inverter that reverses the chrominance phase from frame to frame. Additional processing circuitry is also employed to reduce chrominance signal artifacts produced as a result of frame to frame motion.

Baseband chrominance signal processing techniques are known wherein the chrominance signal is demodulated to baseband component form (e.g., R-Y and B-Y) prior to application of noise reduction. An example of base-band chrominance signal noise reduction is described by Kisou in U.S. Pat. No. 4,928,165 entitled NOISE REDUCTION CIRCUIT FOR A CHROMINANCE SIGNAL OF A USING FRAME CORRELATION (Sic.) which issued May 22, 1990.

The Kisou system includes a decoder for decoding first and second color difference signals, each including a noise component form a received chrominance signal. A signal subtraction circuit generates a first frame difference signal in response to two successive first color difference signals and a second frame difference signal in response to two successive second color difference signals. A signal converting circuit extracts a first compensation signal from the first frame difference signal and a second compensation signal from the second frame difference signal. A noise reduction circuit reduces noises from the color difference signals in response to the compensation signals. A discrimination circuit discriminates whether both the first and second frame difference signals are smaller than a prescribed level or not and generates a control signal in response thereto. A signal transmission circuit transfers the compensation signals from the signal converting circuit to the noise reduction circuit in response to the control signal only when both the frame difference signals are smaller than the prescribed level.

One problem with the Kisou arrangement is that since two chrominance signals are being processed a relatively large number of processing elements is required. In other words, there is a substantial duplication of elements. Also, the use of two frame memories for chrominance signal processing is relatively costly and complex.

SUMMARY OF THE INVENTION

A need exists for a chrominance noise reduction system which does not required frame delays, which is relatively insensitive to frame to frame motion effects and which is relatively free of visual artifacts such as color streaking. A need also exists for a chrominance noise reduction system of relatively simplified construction which may be used with a plurality of baseband signals without requiring substantial duplication of noise reduction elements to accommodate the plural base band signals. The present invention is directed to meeting those needs.

As a brief overview of the invention, it is herein recognized that horizontal recursive filtering of a baseband chrominance component will tend to produce horizontal streaking and that vertical recursive filtering of a baseband chrominance component will tend to produce vertical color streaking. The cause of this streaking effect will be discussed later.

A surprising result is achieved, however, when a baseband color component is subjected to both horizontal and vertical recursive filtering. One would expect that the streaking effect of each filter would be additive and the result would be a picture having both vertical and horizontal streaks. On the contrary, an opposite effect is achieved in accordance with the invention using the filters to be described. Specifically, the streaking of the sum of the filters in the present invention is less than that provided by the filters individually and excellent overall color noise reduction is achieved in two dimensions without the streaking characteristic of the individual filters.

Since it is essential to the practice of the present invention that each color signal must be filtered both vertically and horizontally, one might conclude that a total of four filters would be required for applying noise reduction to the baseband components. Such a case would, of course, be contrary to an object of the invention of simplifying the processing. Advantageously, in accordance with another aspect of the invention, no more filters are required for noise reducing two color difference signals than for noise reducing one color difference signal. This is achieved by a multiplexing technique in combination with some specific selections of filter feedback delay intervals and a specific choice of sampling interval as will be described in detail later.

Chrominance noise reduction apparatus, in accordance with the present invention, includes a source for providing first and second baseband color difference signals to be noise reduced. A first switch means, coupled to the source, alternately samples the color difference signals to provide a multiplexed output signal comprising alternating samples of the first and second color difference signals, each sample having a sample period T selected to provide an even number of samples per horizontal line of the multiplexed output signal. A first recursive filter, having a feedback delay equal to two of the sample periods, horizontally filters the alternating samples of the color difference signals. A second recursive filter, in series with the first recursive filter and having a feedback delay equal to one horizontal line interval, vertically filters the alternating samples of the color difference signals. A second switch means, responsive to the horizontally and vertically recursively filtered alternating samples of the color difference signals, de-multiplexes the samples to provide first and second noise reduced color different output signal, each subjected to vertical and horizontal recursive filtering.

BRIEF DESCRIPTION OF THE DRAWING

The foregoing and further features of the invention are illustrated in the accompanying drawing wherein.

DETAILED DESCRIPTION

Figure 1:
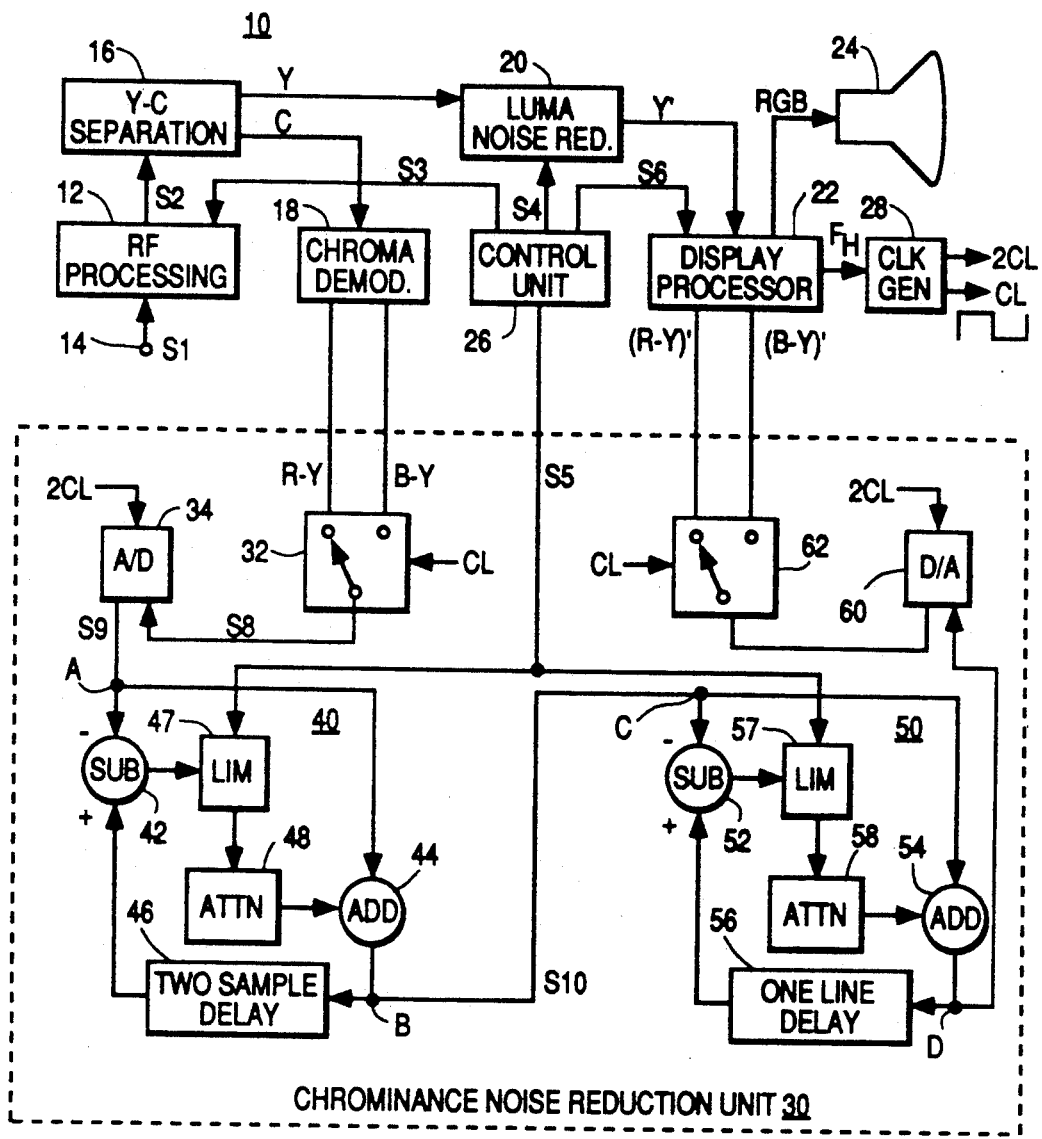
FIG. 1 is a block diagram of a television receiver including a chrominance noise reduction apparatus in accordance with the invention.

The color television receiver 10 of FIG. 1 includes an RF processing unit 12 having an input 14 for receiving an RF modulated color television signal S1 and an output for providing a baseband composite video signal S2. Unit 12 may be of conventional design including a tuner, IF amplifier and detector and it may also include a baseband video switch for selecting baseband video input signals rather than RF input signals for display. The composite video signal S2 provided by processing unit 12 is applied to a luminance-chrominance (Y-C) signal separation circuit 16 which separates the composite video signal S2 into a luminance component Y and a quadrature amplitude modulated chrominance component C. The separated chrominance component C is applied to a chrominance signal demodulator 18 which demodulates the chrominance signal C to provide a pair of baseband color difference signals R-Y and B-Y.

Noise reduction in the receiver of FIG. 1 is provided separately for the luminance Y and chrominance color difference signals R-Y and B-Y. The luminance component Y, for example, is applied to a luminance noise reduction unit 20, which may be of conventional design, and the chrominance color difference signals R-Y and B-Y are applied to a chrominance noise reduction unit 30 embodying the invention. Advantageously, the separate noise reduction processing of the luminance and color difference components allows one to select an optimum noise reduction system for each signal as compared, for example, with previous systems which processed chrominance signals along with luminance signals in a common frame recursive noise reduction system as previously discussed.

The noise reduced luminance signal Y' provided by unit 20 and the noise reduced baseband color difference signals (R-Y)' and (B-Y)' provided by unit 30 are applied to a display processor 22 which produces a color output signal (illustratively, of RGB form) for display by a kinescope 24. Display processor 22 may be of conventional design and provides functions such as brightness and contrast control, hue and saturation control, color matrixing and soforth. The kinescope 24 may be of the direct view type as shown or it may comprise three projection kinescopes or other suitable display devices such as liquid crystal display units.

User control of the various functions of the receiver 10 of FIG. 1 is provided by a control unit 26 which has outputs coupled to the RF processing unit 12, coupled to both noise reduction units 20 and 30 and coupled to the display processor 22. Control unit 26 may be of conventional design such as a microprocessor controlled by a hand-held user remote control unit. The output coupled to RF processing unit 12 provides a control signal S3 thereto for control of the TV channel tuning and video source selection. The noise reduction control signals S4 and S5 supplied to the noise reduction units 20 and 30 provide user control (e.g., on/off or variable) of the noise reduction. The control signal S6 supplied to the display processor 22 provides user control over the various video processing functions previously mentioned.

It is a feature of the invention that the noise reduction system is user controllable to give the user the freedom to turn it off completely or adjust it to some desired value. This feature is desirable because the noise characteristics of different source material can vary substantially. There may be times, for example, where the luminance signal is acceptable without noise reduction but some chrominance signal noise reduction is indicated. The use of separate noise reduction control signals (S4 and S5) gives the user the opportunity to meet this need. The minimum information required of the chrominance noise reduction signal S5 is a simple on/off command which, for digital or analog implementation, requires only one control conductor. For more control flexibility, the noise reduction control signal may comprise a two bit digital signal thus defining four separate states or levels of noise reduction (e.g., 00 for off, 01 for low, 10 for medium and 11 for high) as will be discussed later. Alternatively, the noise reduction control signal S5 may be an analog signal in which the zero level thereof disables the noise reduction and the amplitude thereof other than zero controls the noise reduction limiter thresholds (as will be explained) and therefore the degree of noise reduction.

The chrominance noise reduction circuit 30 (outlined in phantom) embodying the invention includes an input multiplex switch 32 to which the baseband color difference signals R-Y and B-Y are applied. The function of switch 32 is to alternately sample the color difference signals R-Y and B-Y to provide a multiplexed output signal S8 comprising alternating samples of the color difference signals, each sample having a sample period "T" selected to provide an even number of samples per horizontal line of the output signal S8. To meet these requirements, the switch 32 is controlled by a clock signal CL that is provided by a clock signal generator 28 that is "line locked" to a multiple of the video signal horizontal line rate. Illustratively, clock signal generator 28 may comprise a multiplying type of phase lock loop (PLL) that is phase locked to the horizontal line frequency "H" provided by the display processing unit 22 as illustrated. For illustrative purposes, it will be assumed hereafter that the clock signal CL is equal to 128 times the line frequency or horizontal sweep frequency, Fh.

Figure 2:
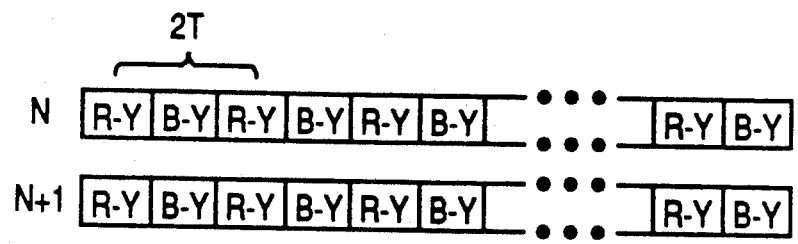
FIG. 2 is a diagram illustrating multiplexing of color difference signals in the noise reduction apparatus of FIG. 1.

FIG. 2 illustrates the multiplexed samples of the R-Y and B-Y baseband color difference signals provided by multiplex switch 32. As seen, there are an even number of samples per line. This is important, as will be explained in more detail later, because it ensures that the samples of line "N" are vertically aligned with the samples of the next line "N+1". This feature of the invention is evident from FIG. 2 where it is shown that the R-Y samples form a vertical column and the B-Y samples form a vertical column. If the number of samples per line were not an even number the R-Y and B-Y samples would be laterally skewed thereby greatly complicating the problem of subsequent filtering operations.

Returning to FIG. 1, the multiplexed samples (signal S8) are applied to an analog to digital (A/D) converter 34 for conversion to digital form (signal S9). Note that A/D converter 34 is clocked by a clock signal 2CL of twice the frequency of the multiplex switch clock signal CL. This is because one conversion of the analog sample R-Y is done when the signal CL is high and one conversion of the analog signal B-Y is done when the signal CL is low. Accordingly, two digital samples are produced during one complete cycle of the multiplex clock signal and so the A/D conversion frequency must be twice the multiplex clock frequency. This double frequency (2CL) clock frequency is provided by the clock signal generator 28.

At this point it may be noted that although digital processing is preferred for subsequent operations, it is not at all necessary and the analog to digital converter 34 may be omitted, if desired, and the subsequent processing may be performed by analog elements. The reason that digital processing is preferred is that later elements require signal delays of a full video line and such delays are easily achieved with high accuracy for digital signals but are more difficult to provide with high accuracy for analog signals.

The multiplexed digital signal S9 is next applied to a first recursive filter (indicated generally as filter 40). In accordance with a feature of the invention, it is essential that the feedback delay of the filter 40 be equal to two of the sample periods "T" for horizontally filtering the alternating samples of the R-Y and B-Y color difference signals. The feedback delay of the horizontal filter 40 must be exactly two sample periods T in order to ensure that R-Y samples are processed with only R-Y samples and the B-Y samples are filtered only with respect to B-Y samples. This follows from the signal format shown in FIG. 2 where it is seen that the R-Y and B-Y samples alternate with each sample period, T. If the horizontal recursive filter delay were an odd number of samples, then the R-Y and B-Y samples would be mixed up. Accordingly, it is absolutely essential that the horizontal filtering be done on a basis of a two sample delay period.

In more detail, the horizontal recursive filter 40 comprises an input node "A" to which signal S9 is applied. Node "A" is connected to respective first inputs of a subtracter 42 and an adder 44. An output node "B" is coupled to an output of the adder 44 and is coupled via a delay unit 46 to a second input of the subtracter 42. The delay of the delay unit 46 is equal to two sample delay intervals. A circuit path including a limiter 47 and an attenuator 48 is coupled between the output of the subtracter 42 and a second input of the adder 44. The attenuator 48 effectively limits the small signal gain of the circuit path to less than unity thereby avoiding any chance of oscillation of the filter since the feedback through the delay and circuit path is positive. Illustratively, the attenuator 48 may have a transfer ratio of $\frac{7}{8}$ or some similar value slightly less than unity.

Figure 3:
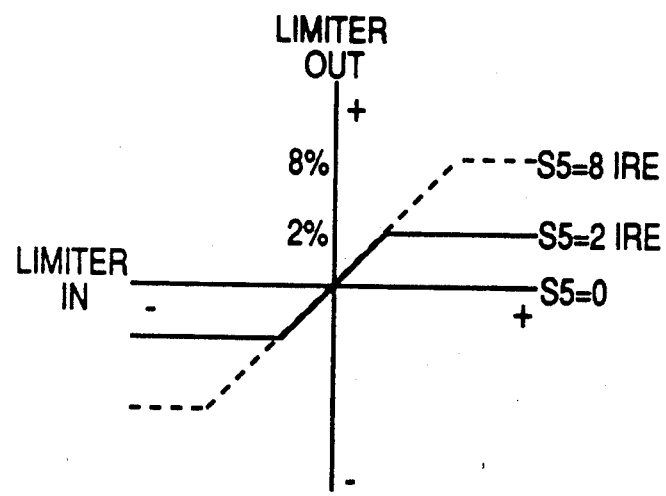
FIG. 3 is an exemplary transfer characteristic of a limiter used in the chrominance noise reduction apparatus of FIG. 1.

The attenuator 48 is not essential, however, as this element may be eliminated completely if other means are provided for limiting the gain to less than unity. As an example, the limiter 46 may be implemented as a programmed read only memory or "ROM" in which case the ROM may be easily programmed to have a small signal gain of less than unity thereby eliminating the need for a separate attenuator. The use of a ROM for limiter 47 has the further advantage in that by programming several addresses with different limiting levels one may thereby control the gain of the noise reduction system by simply addressing different ROM memory locations with the noise reduction control signal S5. Examples of a ROM programmed for different limiting levels of the signal S5 are shown in FIG. 3. The horizontal axis shows the input signal level and the vertical axis shows the output signal level. The transfer curves are shown for limiting levels of zero, 2 IRE and 8 IRE levels as selected by address inputs to the ROM thereby providing OFF, low and High levels of color noise reduction.

As an example, to disable the noise reduction system completely, the signal S5 may be used to select ROM addresses where all data outputs are equal to zero regardless of the actual values of the address inputs provided by subtracter 42. As a second example, to provide a low level of noise reduction the ROM may be programmed such that subtracter output levels in the 0-3 IRE range are passed by the ROM but levels above 3 IRE are limited. As a third example for high levels of noise reduction ROM addresses may be selected to provide output signals in a wider range, e.g., to 8 IRE units for subtracter output signals (addresses) up to the 8 IRE level.

Operation of the multiplexed recursive horizontal filter 40 may be easily understood by consideration of a few specific examples. Basically, this filter produces separate averages of the R-Y and B-Y samples due to the two sample delay. For small signals, below the limiting level of limiter 47 the output signal at node "B" converges to the average of the R-Y samples when an R-Y sample is applied to the input node "A" and it converges to the average of the B-Y samples when a B-Y sample is applied to the input node "A". The limiter 47, however, limits the averaging process for input signals greater than the limiting level so that if large changes in the input signal occurs the output signal at node "B" is essentially the input signal at node "A". Thus, for small signals, the noise is subjected to averaging and a signal to noise ratio improvement is obtained and for large signals, above the limiting level, the chrominance signal component is passed to the output (node B) without averaging so that high definition of large signal transitions is achieved.

Another way to view the operation of the horizontal recursive filter 40 is as follows. The subtracter 42 produces the difference between the incoming chrominance component and the two sample delayed chrominance component. Limiter 47 passes this difference if it is small and the difference signal is added by adder 44 to the input signal at node A. As a result, the input signal is mostly cancelled and replaced by the averaged output signal if the input signal is small. However, large changes in the input signal result in large differences in the output signal of subtracter 42. Accordingly, limiter 47 will limit the subtracter output signal to a low level thereby causing the output of adder 44 to be almost exclusively to be comprised of the input signal due to the limiting effect of limiter 47. For this to occur, limiter 47 has a gain selected to be less than unity (e.g., ⅞) when it is not limiting so that the output signal always converges towards the average of the input signal S9.

As previously noted, the horizontal filter will produce horizontal streaking. This follows because horizontal lines of the color components may be expected to differ from line to line for real images and so each line will be filtered (averaged differently). These horizontal streaks may be nullified, in accordance with the invention, by vertically recursively filtering the color components. This is provided by the vertical recursive filter 50.

Filter 50 comprises an input node C to which the horizontally recursively filtered signal S 10 is applied. Node C is connected to respective first inputs of a subtracter 52 and an adder 54. An output node D is coupled to an output of the adder 54 and is coupled via a delay unit 56 to a second input of the subtracter 52. The delay of the delay unit 56 is equal to one horizontal line interval. It is essential, as previously noted, that there be an even number of samples per line to ensure that all samples are orthogonal (vertically aligned). A circuit path (56,58) including a limiter 57 and an attenuator 58 is coupled between the output of the subtracter 52 and a second input of the adder 54. The attenuator 58 effectively limits the small signal gain of the circuit path to less than unity thereby avoiding any chance of oscillation of the filter since the feedback through the delay and circuit path is positive. Illustratively, the attenuator 58 may have a transfer ratio of ⅞ or some similar value slightly less than unity.

As previously explained with regard to filter 40, the attenuator 58 may be eliminated completely if other means are provided for limiting the gain of the filter 50 to less than unity. Limiter 57, preferably, this may be done by implementing the limiter 57 as a read only memory (ROM) as previously explained in detail with regard to filter 40.

Operation of the filter 50 is identical to that of filter 40 except that the filtering direction is vertical rather than horizontal. In this connection it should be emphasized that the selection of an even number of samples per line is absolutely essential to avoid skew errors. The samples must be vertically aligned as shown in FIG. 2 to ensure that R-Y samples are averaged with R-Y samples and that B-Y samples are averaged with B-Y samples.

The vertical multiplexed color filter 50 also produces streaking effects due to changes in color in the vertical direction. As previously noted, however, the horizontal color streaking produced by filter 40 when combined with the vertical color streaking produced by filter 50 tends to produce a picture with little or no visible streaking effects. In other words, the combination results an unexpected result, namely, the streaking effects appear visually to be non-additive and an improved color picture results. Also, as previously noted, the use of multiplex techniques and the specific choice of the number of samples per line results in a system where only two filters are required to provide color signal improvement rather than four filters which would otherwise be required.

After multiplexing, horizontal recursive multiplex filtering and vertical multiplex filtering, the processed signal at output node D is converted back to analog to form by digital to analog converter 60 and is de-multiplexed to individual component form by de-multiplex switch 62 for application to the display processor 22 of receiver 10.

There has been shown and described herein a chrominance noise reduction system in which base band chrominance components are time division multiplexed and subjected to vertical and horizontal recursive filtering thereby providing color component noise reduction in which vertical streaking characteristic of the vertical recursive filtering is effectively visually cancelled by horizontal streaking characteristic of the horizontal recursive filter thereby providing the benefits of (1) noise reduced baseband chrominance components (2) with minimal visual artifacts, (3) without requiring duplication of filtering elements whereby (4) reliability is increased and with a minimum of filtering elements and (5) costs are proportionately reduced.

Various changes may be made to the specific embodiment of the invention shown herein. As previously noted, analog processing rather than digital processing may be used by eliminating the A/D and D/A converters. The multiplexing may be eliminated also but only at the cost of doubling the number of filters required which, as previously explained, is contrary to the object of the invention of circuit simplification. Also, different forms of recursive filters may be employed other than those shown provided, however, that they provide small signal limiting and orthogonal filtering in the vertical and horizontal directions with samples selected to provide an orthongonal array and an even number of samples per line.

What is claimed is:

1. Chrominance noise reduction apparatus, comprising:
   a source for providing first (R-Y) and second (B-Y) baseband color difference signals
   first switch means coupled to said source for alternately sampling said color difference signals to provide a multiplexed output signal comprising alternating samples of said first and second color difference signals, each sample having a sample period "T" selected to provide an even number of samples per horizontal line of said output signal;
   a first recursive filter having a feedback delay equal to two of said sample periods for horizontally filtering said alternating samples of said color difference signals;
   a second recursive filter in series with said first recursive filter and having a feedback delay corresponding to one horizontal line interval for vertically filtering said alternating samples of said color difference signals; and
   second switch means responsive to the horizontally and vertically recursively filtered alternating samples of said color difference signals for de-multiplexing said samples to provided first and second noise reduced color difference output signals, each subjected to vertical and horizontal recursive filtering.

2. Apparatus as recited in claim 1 wherein each of said filters includes a respective limiter, each limiter having a control terminal for controlling the limiting level thereof and said control terminals are coupled together and to a common source of control signal for concurrently controlling the limiting levels of both said limiters in response to said control signal.

3. Chrominance noise reduction apparatus, comprising:
 a source for providing first and second baseband color difference signals
 first switch means coupled to said source for alternately sampling said color difference signals to provide a multiplexed output signal comprising alternating samples of said first and second color difference signals, each sample having a sample period "T" selected to provide an even number of samples per horizontal line of said output signal;
 a first recursive filter having a feedback delay equal to two of said sample periods for horizontally filtering said alternating samples of said color difference signals;
 a second recursive filter in series with said first recursive filter and having a feedback delay corresponding to one horizontal line interval for vertically filtering said alternating samples of said color difference signals;
 second switch means responsive to the horizontally and vertically recursively filtered alternating samples of said color difference signals for de-multiplexing said samples to provided first and second noise reduced color difference output signals, each subjected to vertical and horizontal recursive filtering; and
 wherein said first filter comprises an input connected to first inputs of a subtracter and an adder, an output coupled to an output of said adder and coupled via a delay unit to a second input of said subtracter; and a circuit path, including a limiter, coupled between an output of said subtracter and a second input of said adder, and circuit means for effectively limiting the small signal gain of said circuit path to less than unity.

* * * * *